United States Patent
Castor et al.

(10) Patent No.: US 9,288,525 B2
(45) Date of Patent: Mar. 15, 2016

(54) INTER-DEVICE COMMUNICATIONS USING VISIBLE LIGHT

(75) Inventors: Douglas R. Castor, Norristown, PA (US); Kandarp Shah, Wheeling, IL (US); Robert G. Gazda, Spring City, PA (US); Serhad Doken, Chester Springs, PA (US)

(73) Assignee: InterDigital Patent Holdings, Inc, Wilmington, DE (US)

( * ) Notice: Subject to any disclaimer, the term of this patent is extended or adjusted under 35 U.S.C. 154(b) by 1 day.

(21) Appl. No.: 13/695,012

(22) PCT Filed: Apr. 26, 2011

(86) PCT No.: PCT/US2011/033898
§ 371 (c)(1),
(2), (4) Date: Apr. 10, 2013

(87) PCT Pub. No.: WO2011/137100
PCT Pub. Date: Nov. 3, 2011

(65) Prior Publication Data
US 2013/0208184 A1 Aug. 15, 2013

Related U.S. Application Data

(60) Provisional application No. 61/328,410, filed on Apr. 27, 2010.

(51) Int. Cl.
*H04B 10/116* (2013.01)
*H04N 21/41* (2011.01)
*H04B 10/114* (2013.01)

(52) U.S. Cl.
CPC ......... *H04N 21/4126* (2013.01); *H04B 10/116* (2013.01); *H04B 10/1149* (2013.01)

(58) Field of Classification Search
CPC .................. H04B 10/1149; H04B 10/116
USPC ............................................. 398/172
See application file for complete search history.

(56) References Cited

U.S. PATENT DOCUMENTS

| | | | |
|---|---|---|---|
| 8,503,886 B1 * | 8/2013 | Gunasekara et al. | 398/172 |
| 2002/0143805 A1 | 10/2002 | Hayes et al. | |
| 2006/0056855 A1 | 3/2006 | Nakagawa et al. | |
| 2007/0086668 A1 * | 4/2007 | Ackley et al. | 382/243 |
| 2007/0147843 A1 | 6/2007 | Fujiwara | |
| 2008/0122994 A1 * | 5/2008 | Cernasov | 349/1 |
| 2009/0002265 A1 * | 1/2009 | Kitaoka et al. | 345/4 |
| 2010/0110088 A1 * | 5/2010 | Lee et al. | 345/520 |
| 2011/0135317 A1 * | 6/2011 | Chaplin | 398/172 |

OTHER PUBLICATIONS

Edge Electronics, "Samsung Unveils New Cutting-edge Liquid Crystal Displays (LCDs) at SID 2009 Exhibition", https://web.archive.org/web/20090418173411/http://www.digitalsignagetoday.com/video gallery.php?v=1900, Jun. 1, 2009, accessed Sep. 22, 2015, 2 pages.

Digital Signage Today, "Samsung Interactive Vending Machine for Coco-Cola", https://web.archive.org/web/20090815090517/http://www.edgeelectronics.com/news-article.asp?name=samsung-unveils-new-cutting-edge-liquid-crystal-displays-lcds-at-sid-2009-exhibition, Apr. 8, 2009, accessed Sep. 22, 2015, 5 pages.

* cited by examiner

*Primary Examiner* — Leslie Pascal
(74) *Attorney, Agent, or Firm* — Condo Roccia Koptiw LLP

(57) ABSTRACT

A visual light communication (VLC) medium is used to provide communicative coupling between two or more devices. The communicative coupling supports a variety of functions such as, for example, device discovery, content discovery, and seamless transfer of media between the two or more devices.

10 Claims, 10 Drawing Sheets

INTER-DEVICE COMMUNICATIONS USING VISIBLE LIGHT

CROSS REFERENCE TO RELATED APPLICATIONS

This application claims the benefit of U.S. provisional application No. 61/328,410, filed Apr. 27, 2010, the contents of which is incorporated herein by reference in its entirety.

TECHNICAL FIELD

The instant application relates to communications systems and devices and, more particularly, to systems and methods of using visible light for propagating data between devices.

BACKGROUND

Users of multimedia systems desire to enable applications to work together to deliver seamless media mobility, even though the applications may be executing on different devices. For example, a user may wish to transfer a media stream from a video display to a mobile phone, such that at least a portion of the media stream that was displayed on the video display may be displayed on the mobile phone.

SUMMARY

Disclosed herein are systems and methods for using a visual light communication (VLC) medium to provide communicative coupling between two or more devices. The communicative coupling supports a variety of functions such as, for example, device discovery, content discovery, and seamless transfer of media between the two or more devices.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
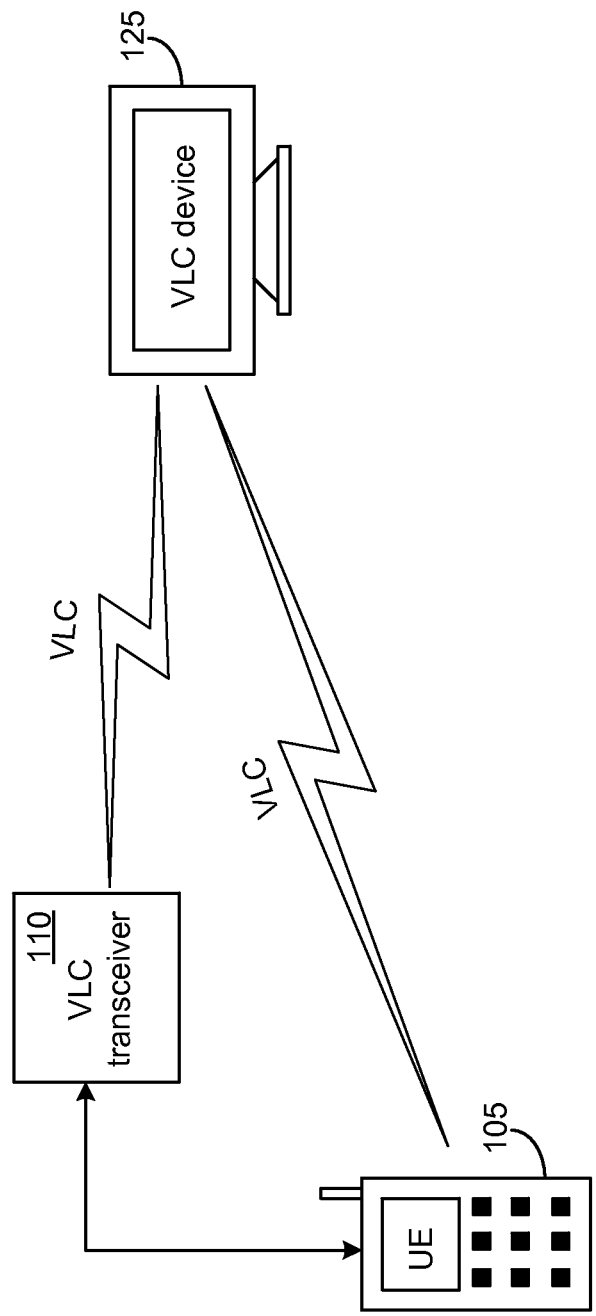
FIG. 1 illustrates an example embodiment of a system for using a visible light communications (VLC) medium.

It should be noted that certain words, phrases, and terms used herein have been selected on the basis of convenience for description and should not be interpreted in a limiting manner. As one such example, the phrase "multimedia" has been used below in the context of various types of media, such as, those associated with, for example, displaying videos, displaying photographs, projecting images that are a part of a video or a slide show, rendering images that are a part of a video stream, etc, etc. Consequently, the phrase "multimedia" as well as several other phrases and terms used herein must be interpreted so as to encompass a variety of different applications, devices and systems. Also, although the description below provides certain examples of possible implementations, it should be noted that these are merely examples and in no way limit the scope of the application. A detailed description of illustrative embodiments will now be described.

A multimedia system may involve multiple users, multiple user equipment (UE), public devices, private devices, enterprise systems, network services, or the like. These multimedia systems may require the convergence and collaboration of media devices to allow applications to support interaction between multiple devices and data mobility between devices. To enable convergence and collaboration of media devices, a process of detecting the location and presence of media devices may be coupled with implementing media flows to enable media mobility, support data flow optimization, and/or enable context specific content among multiple applications and devices. Additionally, media mobility may allow users to manually or automatically transfer media content sessions across various UE, such as laptops, handhelds, televisions, LCD displays, or the like.

Features such as detecting the presence of a device in a vicinity of another device (or in a geographic area), detecting/discovering available media content, providing/detecting handover opportunities for seamlessly handing over media content, may be carried out using a visible light communications (VLC) medium as disclosed herein. VLC may utilize visible light in an approximate wavelength range between 375 nm and 780 nm. This loosely translates to a frequency bandwidth of 300-400 THz.

As can be understood, visible light may be originated by a variety of light sources. A few non-limiting examples of visible light sources include light emitting diodes (LEDs) of various types (inorganic as well as organic), lamps of various types (incandescent, fluorescent etc), backlit liquid crystal displays (LCDs) etc. These light sources may be incorporated into a wide variety of devices, such as for example, LEDs integrated into a display screen (of a television, PC monitor etc), a billboard, illuminating devices (flashlights, floodlights etc). The light sources may be adapted and operated to implement VLC systems and methods as disclosed herein. A number of modulation schemes may be used to modulate light sources for carrying out VLC. A few examples schemes include pulse position modulation, sub-carrier pulse position modulation, sub-carrier frequency shift keying, sub-carrier phase shift keying, or the like. The modulation parameters, such as, for example, carrier wavelength, repetition rate, modulation format, mode of operation (continuous, burst etc) are selected on the basis of various factors which will be described below.

For example, when VLC is implemented in an LED-based television screen (e.g., video display), the modulation scheme and transmission characteristics are selected so as avoid intruding upon, or disturbing, the picture and sound quality of, for example, television program material. Thus, one or more LEDs contained in the television screen may be operated in a dual-purpose mode, wherein the first mode is directed at producing an image (TV picture) on the display screen while the second mode is directed at implementing VLC so as to allow the television set to communicatively couple with another device in the room, for example. As a further example, one or more LEDs contained in a monitor screen of a personal computer (PC), or a large display screen coupled to the PC for large screen viewing, may be operated in a dual-purpose mode, wherein the first mode is directed at producing an image (desktop view, application view, slideshow etc) on the screen while the second mode is directed at implementing VLC so as to allow the monitor screen to communicatively couple with another device in the room, for example a personal digital assistant (PDA).

VLC may be integrated into various displays used for displaying various types of images, including, for example, displays configured for displaying multimedia content. VLC provides a physical layer communication medium that may be used to exchange device location and presence protocols. For example, one or more LEDs contained in a backlighting unit of an LCD screen, which may be used for displaying multimedia, may be modulated to transmit data via VLC, without interfering with the image content displayed on the LCD screen. Multimedia displays may be found in a number of devices such as, for example, laptops, monitors, public signboards, handheld devices, computing devices, or the like. Additionally, convenience lighting on devices, such as keypad illumination on a handheld device, may also be used for VLC.

The use of VLC may provide several advantages. For example, visible light does not propagate through solid objects, such as for example, the wall of a room, thereby providing certain security features in inter-device data transfer. Furthermore, the attenuation characteristics of visible light allows propagation of data over longer distances with less interference than some other types of media (e.g. radio frequencies). Furthermore, VLC allows directional data propagation in a narrow field of view, for example, in the same direction as where a viewer is located for viewing images displayed on a display screen, thereby preventing unauthorized accessing of data by others who are not in a line-of-sight with the display screen.

VLC may also generate faster association rates for data exchanges. When the light source is one or more LEDs of an LED display screen, the content displayed on the display screen may be identified for association with information carried over the VLC medium. For example, an image object may be displayed on an LED monitor. The LEDs displaying the image object may be modulated not only for displaying the pixels of the image object but also to implement VLC for transmitting information pertaining to the object. Some examples of such information include details of the contents of the file from which the image object is being accessed, file location information, routing information etc. Routing information may be information that may enable fetching of the data file via an IP network. When a viewer aims a device (a PDA for example) at the image object displayed on the display, the UE may demodulate the VLC transmission and process the VLC data to obtain information pertaining to the image object. Additional actions may be carried out on the basis of the obtained information. For example, the PDA may automatically trigger an FTP request to download the file into the PDA. As another example, when the VLC data contains content (in addition to, or in lieu of, the information pertaining to the file location of the content), the PDA may directly retrieve the content from the VLC medium and store the retrieved content in the PDA.

To enable a device to receive VLC, various receiving devices such as a transceiver, a receiver, a photodetector, and/or a camera may be used. For example, the camera of a mobile device (such as a cellphone or a PDA) may be used to receive VLC. The VLC may take the form of a bit pipe integrated into visual multimedia content. The VLC transceiver may be integrated into the body of the device, or may be an external device attached to the device. The external VLC transceiver may be connected to the device via a wireless or wired connection, such as USB, Wi-Fi, Ethernet, or the like.

A device using VLC may be a component of a networked system architecture, peer-to-peer system architecture, or the like. VLC may also be used to identify and/or select handover opportunities for multimedia mobility. For example, VLC may be used for device discovery, content discovery, device presence, or the like. VLC may enable multimedia mobility between multiple devices and may enable multimedia mobility when a target device is blank and/or in sleep mode. VLC may also be integrated with multimedia codec metadata, such as MPEG-7, VC-1, VPx, DivX, or the like. For example, metadata within a DivX file may be used to modulate a display capable of backlight modulation.

The metadata may include audio, visual, or other media description schemes that may be propagated or broadcast to VLC enabled devices. The metadata may also be a part of music, a video stream, or a multimedia object that may be a coupon or a commercial advertisement. For example, a VLC enabled device may display advertisements via a user interface. When a VLC enabled device has multiple advertisements to display, the VLC enabled device may present these advertisements in multiple metadata form within a VLC sub channel(s). Additionally, these advertisements may be presented with picture-in-picture split screens that may be embedded with multiple hyperlinks. For example, a VLC enabled advertising display at a public place may broadcast multiple metadata containers to all VLC enabled endpoints within its VLC domain which UE devices may retrieve and respond suitably. Moreover, a UE may advertise its content via its VLC interface to other UE devices. This may be done to accelerate or ease media mobility operations.

Attention is now drawn to FIG. 1, which shows an example embodiment of a system for using a VLC medium. This may be done, for example, to enable multimedia mobility presence and/or content discovery using VLC.

As shown in FIG. 1, the example embodiment may include UE 105, which may be, for example. a mobile device, a cellular phone, a fixed phone, a laptop, a smart phone, a personal digital assistant (PDA), a computing device, or the like. UE 105 is operatively connected to VLC transceiver 110 and/or VLC device 125 via a wireless or wired connection, such as USB, Wi-Fi, Ethernet, or the like. UE 105 receives VLC signals directly from VLC device 125, or may receive VLC signals from VLC device 124 via VLC transceiver 110.

VLC transceiver 110 may be operatively connected to UE 105 and/or VLC device 125 via a wireless or wired connection, such as USB, Wi-Fi, Ethernet, or the like. Additionally, VLC transceiver 110 may be configured to receive VLC signals that may be transmitted by VLC device 125. VLC transceiver 110 may also be configured to transmit VLC signals on behalf of UE 105. In one example embodiment, VLC transceiver 110 may be integrated within UE 105. In another example embodiment, VLC transceiver 110 may be external to UE 105. VLC transceiver 110 may be used to enable UE 105 to receive VLC from a device that transmits VLC, such as the VLC device 125. VLC transceiver 110 may be a transceiver, a receiver, a photodetector, a camera, or the like. For example, the camera of a mobile device may be used to receive VLC that may be in the form of a bit pipe that is integrated into the delivery of visual multimedia content.

VLC device 125 may be, for example, a computing device, a laptop, a mobile phone, a public sign board, or the like that may include a video display, such as an LCD display, an LED display, an OLED display, a television, or the like. In one example embodiment, VLC device 125 may use convenience lighting, such as keypad illumination on a handheld device, as a VLC transmission source. The convenience lighting may be configured for VLC to allow inter-device interactivity as described herein.

VLC device 125 may be used to provide a user with a visual display of multimedia. VLC device 125 may also provide a physical layer that may be used to exchange device location and presence protocols. For example, LEDs associated with a VLC device 125, such as LED backlighting, indicator lighting, or the like may be modulated to transmit data. In an embodiment, a VLC device 125 may propagate VLC such that the VLC signals may not propagate through walls. The VLC propagation may be a direct path between two devices or may be a multi-segment path, for example, with the visible light of the VLC redirected using various light processing devices (lenses, prisms etc) or reflecting surfaces (one-way, two-way mirrors etc). Additionally, VLC device 125 may integrate certain types of image content into the VLC. This image content may be currently on display on a screen, or may be auxiliary content, such as, for example, an advertisement that may be related, or unrelated, to the image content currently on display on the screen.

VLC device 125 may use VLC as a communication medium between VLC device 125, VLC transceiver 110, and/or UE 105. In using VLC as a communication medium, VLC device 125 may use a protocol, such as, for example, an RF protocol, an infrared (IR) protocol, or the like.

Figure 2:
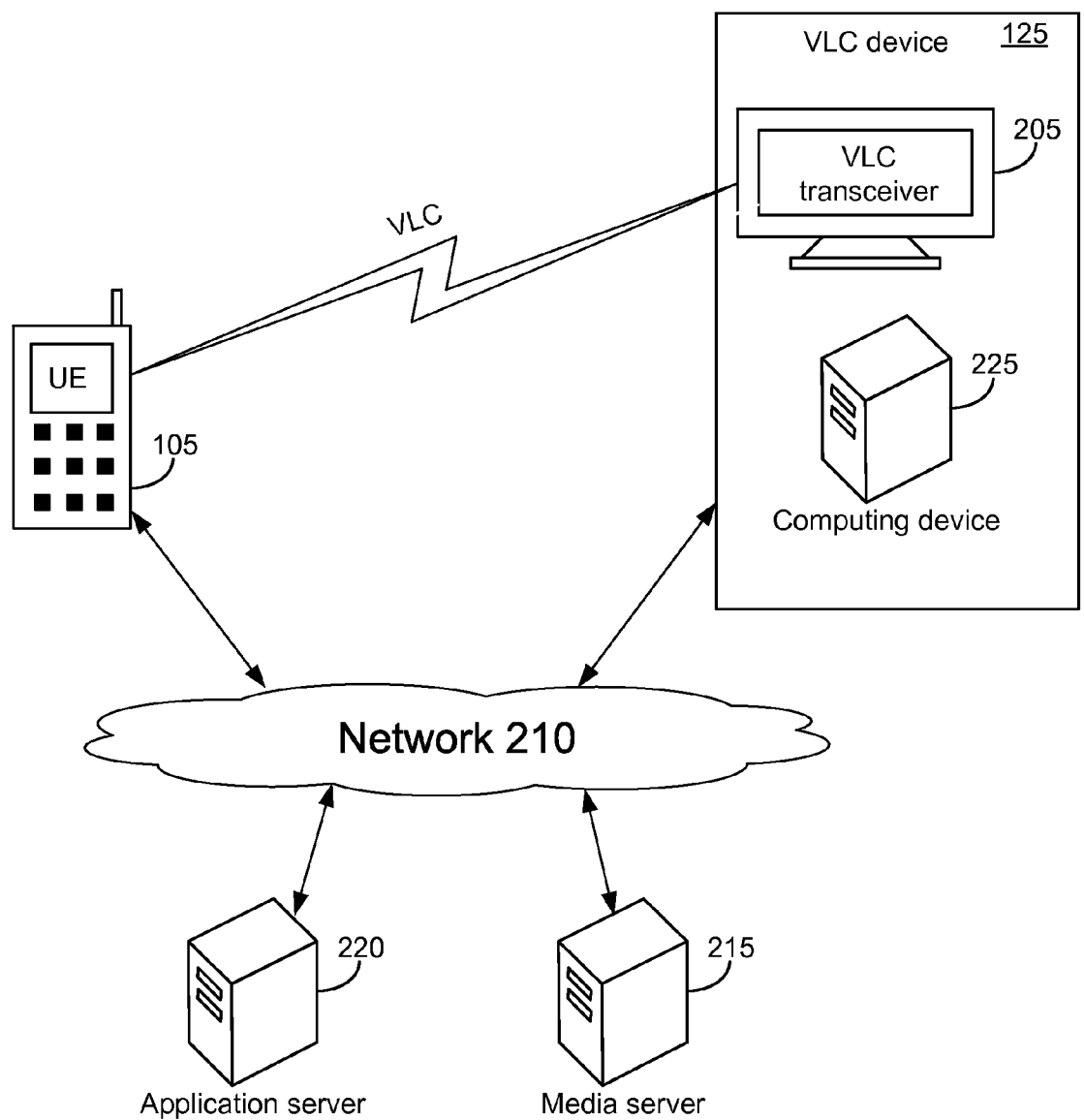
FIG. 2 illustrates an example embodiment of a system for enabling multimedia mobility presence and/or content discovery using VLC.

FIG. 2 illustrates an example embodiment of a system for enabling multimedia mobility presence and/or content discovery using VLC. This may be done, for example, to enable multiple diverse, or non-diverse, applications to work together in order to deliver a rich multimedia experience to a user.

In one example embodiment, the system may be used to identify and/or select the handover opportunity for multimedia mobility. Multimedia mobility may occur between two or more devices, such as UE 105 and/or VLC device 125. For example, VLC device 125 may transmit a media stream, or media stream information to UE 105 when VLC device 125 detects UE 105.

In another example embodiment, the system may be used to discover a device, such as UE 105. For example, VLC device 125 may broadcast VLC device identification. The VLC device identification may be received by UE 105 when UE 105 is within range of VLC device 125. When UE 105 receives the VLC device identification, UE 105 may respond with a message. The message may be transmitted to VLC device 125 via VLC, or may be transmitted to application server 220, media server 215, and/or VLC device 125 via network 210. The message may permit application server 220, media server 215, and/or VLC device 125 to discover UE 105.

In another example embodiment, the system may be used to discover content. For example, VLC device 125 may broadcast VLC device identification and/or stream information. The VLC device identification and/or stream information may be received by UE 105 when UE 105 is within range of VLC device 125. When UE 105 receives the VLC device identification and/or stream information, UE 105 may respond with a message. The message may be transmitted to VLC device 125 via VLC, or may be transmitted to application server 220, media server 215, and/or VLC device 125 via network 210. The message may permit UE 105 to receive a media stream.

As shown in FIG. 2, the example embodiment may include a network 210. Network 210 may be a network such as a Public Land Mobile Network (PLMN), an IMS network, a corporate intranet, a Fixed-End System (FES), the public Internet, or the like. Network 210 may be in operative communication with UE 105, VLC device 125, computing device 225, VLC transceiver 205, application server 220, and/or media server 215. The configurations and the communication between network 210, UE 105, VLC device 125, computing device 225, VLC transceiver 205, application server 220, and/or media server 215 are provided for illustrative purposes only, and as such, the communications between these components may be between different elements and/or through additional elements. For example, application server 220 may communicate with the network 210 through a router.

As mentioned above, UE 105 may be a mobile device, a cellular phone, a fixed phone, a laptop, a smart phone, a personal digital assistant (PDA), a computing device, or the like. UE 105 may be operatively connected to the network such that UE 105 may communicate with other devices connected to the network such as application server 220, media server 215, and/or VLC device 125. UE 105 may receive and/or transmit VLC signals to VLC device 125.

VLC device 125 may include VLC transceiver 205 and/or computing device 225. In one example embodiment, VLC transceiver 205 and computing device 225 may be combined in a same entity. In another example embodiment, VLC transceiver 205 and computing device 225 may be separate entities. VLC device 125 may be used to transmit and/or receive VLC signals from UE 105. For example, VLC device 125 may transmit multimedia content to UE 105 using VLC.

Computing device 225 may be any computing device, e.g., a laptop, a mobile phone, a public signboard, or the like. Computing device 225 may be a programmable machine that may be used to execute one or more applications. The applications executed by the computing device 225 may be used by the computing device 225, the VLC transceiver 205, and/or the VLC device 125.

VLC transceiver 205 may incorporated into an LED display, an LCD display, an OLED display, a television, or the like. VLC transceiver 205 may also be convenience lighting associated with VLC device 125 and/or computing device 225, such as keypad illumination on a handheld device. VLC transceiver 205 may be configured to receive and/or transmit VLC signals to a device, such as UE 105. VLC transceiver 205 may include a transmitter, a receiver, a photodetector, a camera or the like. For example, VLC transceiver 205 may be a camera and a display associated with the computing device 225; the camera may be configured to receive VLC signals, while the display may be configured to transmit VLC signals.

In one example embodiment, application server 220 and media server 215 may be combined in a same entity. In another example embodiment, application server 220 and media server 215 may be separate entities.

Application server 220 may be software and/or hardware. In one example embodiment, application server 220 may be a hardware device such as a computing device, a mainframe system, a desktop, a laptop, or the like. Application server 220 may provide storage of device endpoints associated with applications, such as VLC device 125 and UE 105, and may control mobility aspects. Applications server 220 may control and/or provide data processing to applications that may be executing on UE 105 and/or VLC device 125. For example, application server 220 may retrieve data from a database on behalf of an application executing on UE 105.

Media server 215 may be software and/or hardware. In one example embodiment, media server 215 may be a hardware device such as a computing device, a mainframe system, a desktop, a laptop, or the like. Media server 215 may store and share media. For example, media server 215 may share media with UE 105, application server 220, VLC transceiver 205, computing device 225, and/or VLC devices 125. Media server 215 may be used to stream content to a target destination. For example, media server 215 may stream media content to UE 105 and/or VLC device 125.

Furthermore, as can be seen in FIG. 2, the VLC link between UE 105 and VLC transceiver 205 may be included inside network 210, and as such, the VLC link may be viewed as one segment of network 210. Thus, as can be understood, some segments of network 210 may be configured as copper segments (using an Ethernet cable, for example), some other segments of network 210 may be configured as optical segments (using a fiber optic cable, for example), while yet other links are VLC links that use visible light in a line-of-sight arrangement for transmitting information through open air.

Figure 3:
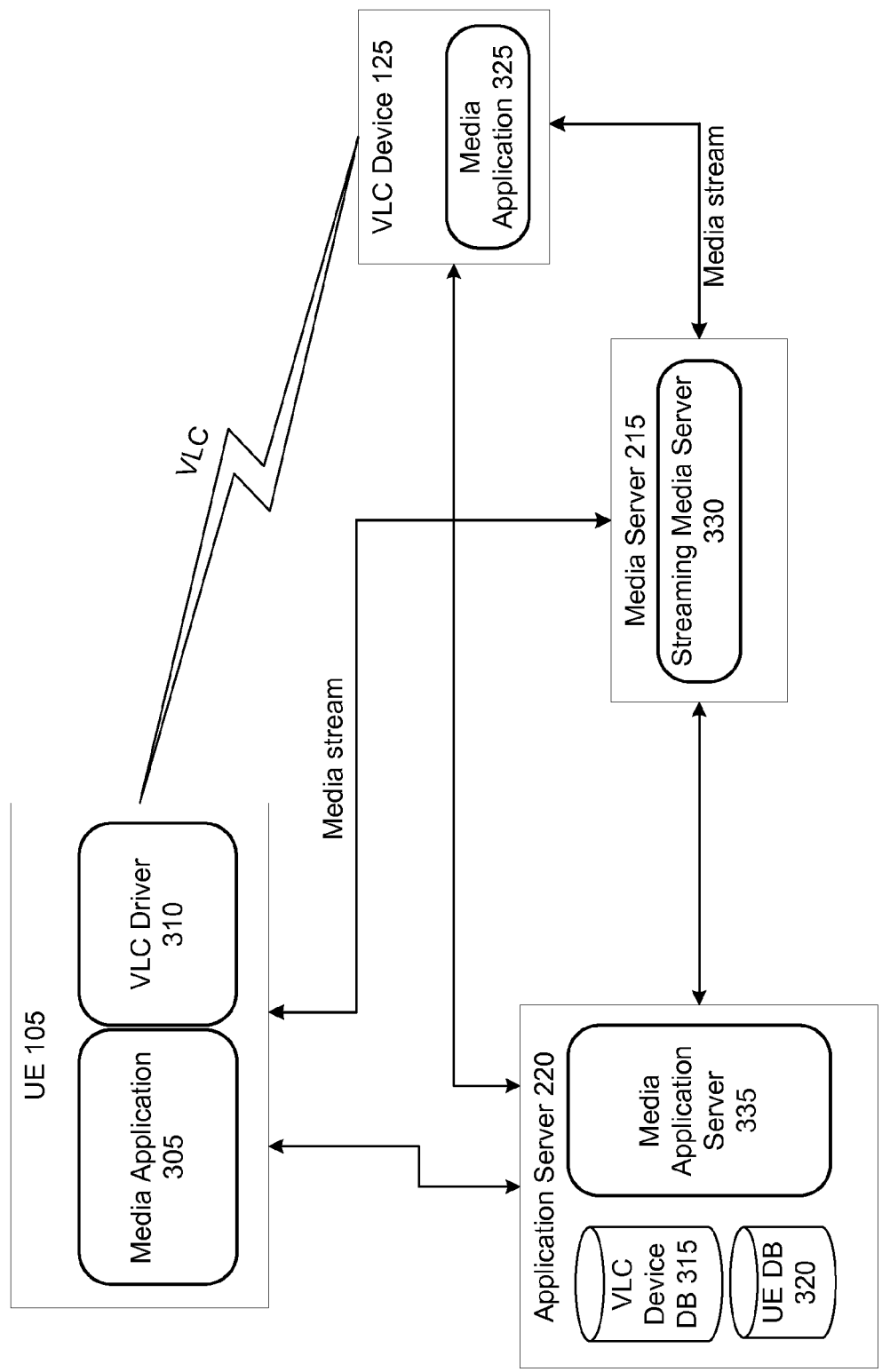
FIG. 3 illustrates another example embodiment of a system for enabling multimedia mobility presence and/or content discovery using VLC.

FIG. 3 illustrates another example embodiment of a system for enabling multimedia mobility presence and/or content discovery using VLC. In one example embodiment, the system may be used to identify and/or select the handover opportunity for multimedia mobility. Multimedia mobility may occur between two or more devices, such as UE 105 and/or VLC device 125. For example, VLC device 125 may transmit a media stream, or media stream information to UE 105 when VLC device 125 detects UE 105.

In another example embodiment, the system may be used to discover a device, such as UE 105. For example, VLC device 125 may broadcast VLC device identification. The VLC device identification may be received by UE 105 when UE 105 is within range of VLC device 125. When UE 105 receives the VLC device identification, UE 105 may respond with a message. The message may be transmitted to VLC device 125 via the VLC link, or may be transmitted via network 210 to one or more of application server 220, media server 215, or VLC device 125. The message may permit one or more of application server 220, media server 215, or VLC device 125 to discover UE 105.

In another example embodiment, the system may be used to discover content. For example, VLC device 125 may broadcast VLC device identification and/or stream information. The VLC device identification and/or stream information may be received by UE 105 when UE 105 is within range of VLC device 125. When UE 105 receives the VLC device identification and/or stream information, UE 105 may respond with a message. The message may be transmitted to VLC device 125 via VLC, or may be transmitted to application server 220, media server 215, and/or VLC device 125 via network 210. The message may permit UE 105 to receive a media stream.

As shown in FIG. 3, UE 105 may communicate with VLC device 125 via VLC. This may be done, for example, to receive and/or transmit control information, media stream information, a media stream, data, or the like. UE 105 may include media application 305 and/or VLC driver 310. Media application 305 may be a software application executing on UE 105, such as, for example, a telephony application, a videoconferencing application, or a videogame application. Media application 305 may receive media streams, such as media streams that may be transmitted by media stream server 215 and/or VLC device 125. Additionally, media application 305 may work in conjunction with one or more of media application 325, media application server 335, or streaming media server 330 to deliver a rich multimedia experience.

VLC driver 310 may be a software application and/or a firmware application that may communicate with VLC transceiver hardware (not shown) such as VLC transceiver 110 shown in FIG. 1. VLC driver 310 may operate as a translator/interface between the VLC transceiver hardware (not shown) and applications or operating systems executing on UE 105.

VLC device 125 may include media application 325. Media application 325 may be a software application executing on VLC device 125, such as a telephony application, a videoconferencing application, or a videogame application. Additionally, media application 325 may work in conjunction with one or more of media application 305, media application server 335, or streaming media server 330 to deliver an interactive multimedia experience.

Media server 215 may include streaming media server 330. Streaming media server 330 may be a software application that may store and share media. For example, streaming media server 330 may distribute streaming media and/or cooperatively interact with one or more of media application 325, media application 305, and media application server 335.

Application server 220, may include media application server 335, VLC device database 315, and/or UE database 320. Media application server 335 may be a software application that may control and/or provide data processing to applications, such as media application 305, media application 325, streaming media server 330, or the like. For example, media application server 335 may retrieve media from a database for media application 305. Additionally, media application server 335 may control mobility aspects for UE 105 and/or VLC device 125.

VLC device database 315 may be a database that provides storage of VLC device endpoints associated with an application, such as media application 325. VLC device database 315 may contain the identity of VLC devices, such as VLC device 125, and may identify VLC devices to a requesting device, such as UE 105 and/or VLC device 125. VLC device database 315 may provide data regarding VLC devices to the media application server 335, media application 305, media application 325, and/or streaming media server 330. In one example embodiment, media application server 335 may use VLC device data to enable the transmission of data between one or more UE devices and one or more VLC devices.

UE database 320 may be a database that provides storage of UE device endpoints associated with an application, such as media application 305. UE device database 320 may contain the identity of UE devices, such as UE 105, and may identify UE devices to a requesting device, such as UE 105 and/or VLC device 125. In one example embodiment, UE device database 320 may provide data regarding UE devices to the media application server 335, media application 305, media application 325, and/or streaming media server 330. In one example embodiment, media application server 335 may use UE device database 315 to enable the transmission of data between one or more UE devices and one or more VLC devices.

Figure 4:
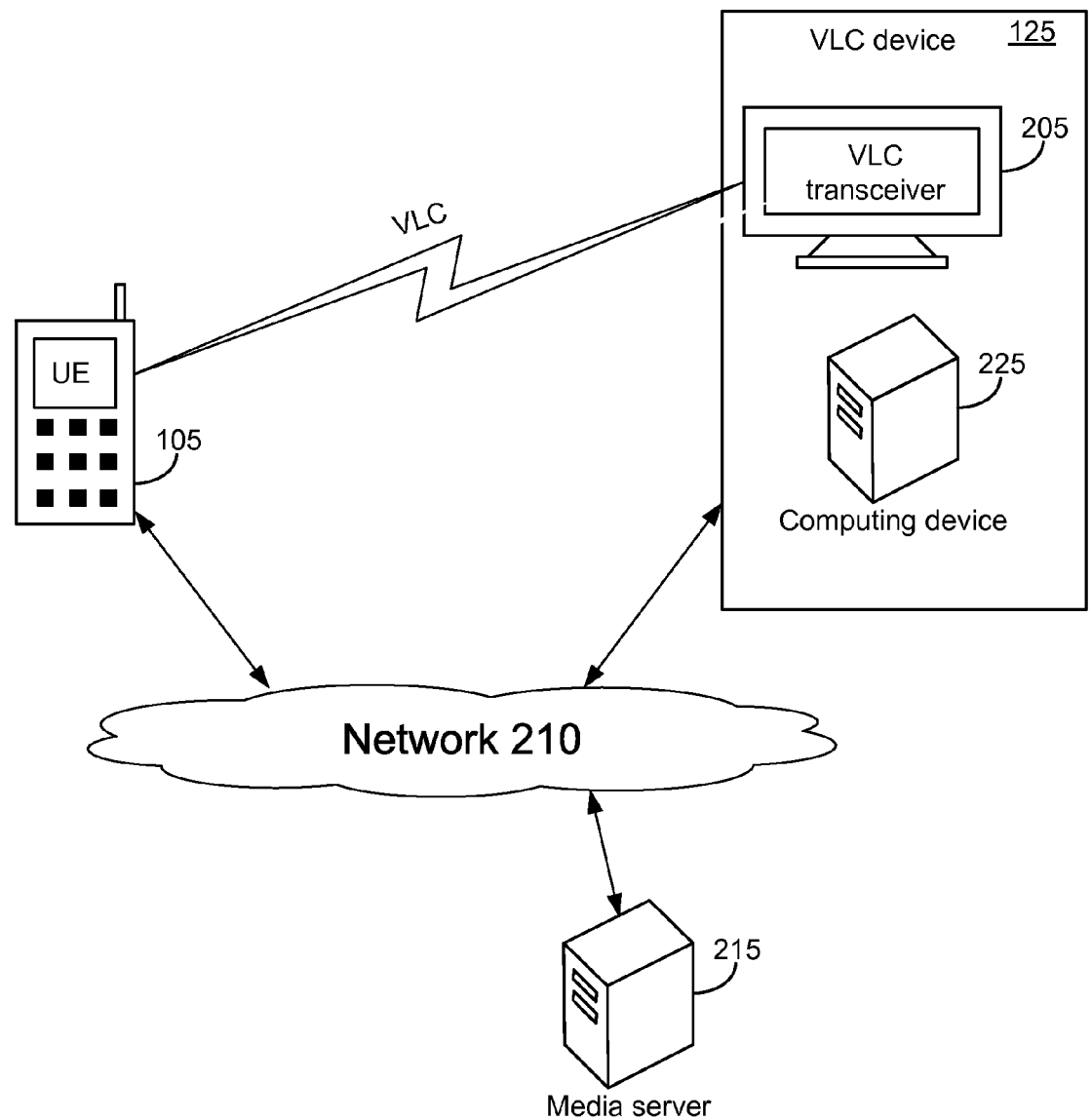
FIG. 4 illustrates an example embodiment of a system for enabling peer-to-peer multimedia mobility presence and/or content discovery using VLC.

FIG. 4 illustrates an example embodiment of a system for enabling peer-to-peer multimedia mobility presence and/or content discovery using VLC. This may be done, for example, to enable multiple applications to work together in order to deliver a rich multimedia experience for a user without an application server.

In one example embodiment, peer devices may be any device, such as UE 105, VLC device 125, or the like. Peer media applications executing on the peer devices may exchange control and data through network 210 and/or VLC. Each peer device may be operatively connected to media server 215, via network 210.

In another example embodiment, the system may be used to identify and/or select the handover opportunity for multimedia mobility. Multimedia mobility may occur between two or more peer devices, such as UE 105 and VLC device 125. For example, VLC device 125 may transmit a media stream, or media stream information to UE 105 when VLC device 125 detects UE 105.

In another example embodiment, the system may be used to discover a device, such as UE 105. For example, VLC device 125 may broadcast VLC device identification. The VLC device identification may be received by UE 105 when UE 105 is within range of VLC device 125. When UE 105 receives the VLC device identification, UE 105 may respond with a message. The message may be transmitted via network 210 to VLC device 125 via VLC, or may be transmitted to media server 215, and/or VLC device 125. The message may permit media server 215, and/or VLC device 125 to discover UE 105.

In another example embodiment, the system may be used to discover content. For example, VLC device 125 may broadcast VLC device identification and/or stream information such as media and/or media-related information. The VLC device identification and/or stream information may be received by UE 105 when UE 105 is within range of VLC device 125. When UE 105 receives the VLC device identification and/or stream information, UE 105 may respond with a message. The message may be transmitted to VLC device 125 via VLC, or may be transmitted via network 210 to media server 215 and/or VLC device 125. The message may permit UE 105 to receive a media stream.

As shown in FIG. 4, the example embodiment may include a network 210. Network 210 may be a network such as a Public Land Mobile Network (PLMN), an Internet Protocol Multimedia Subsystem (IMS) network, a corporate intranet, a Fixed-End System (FES), the public Internet, or the like. Network 210 may provide operative communications between two or more of UE 105, VLC device 125, computing device 225, VLC transceiver 205, and media server 215. The configurations and the communication links between network 210, UE 105, VLC device 125, computing device 225, VLC transceiver 205 and/or media server 215 are provided for illustrative purposes only, and as such, the communications between these components may be between different elements and/or through additional elements. For example, media server 215 may communicate with the network 210 through a router (not shown).

UE 105 may be a mobile device, a cellular phone, a fixed phone, a laptop, a smart phone, a personal digital assistant (PDA), a computing device, or the like. UE 105 may be operatively connected to the network such that UE 105 may communicate with other devices connected to the network such as media server 215, and/or VLC device 125. UE 105 may receive and/or transmit VLC signals to VLC transceiver 205.

VLC device 125 may be a device that includes VLC transceiver 205 and/or computing device 225. In one example embodiment, VLC transceiver 205 and computing device 225 may be combined in a same entity. In another example embodiment, VLC transceiver 205 and computing device 225 may be separate entities. VLC device 125 may be used to transmit and/or receive VLC signals from UE 105. For example, VLC device 125 may transmit multimedia content to UE 105 using VLC.

Computing device 225 may be a computing device, a laptop, a mobile phone, a public signboard, or the like. Computing device 225 may be a programmable machine that may be used to execute one or more applications. The applications executed by the computing device 225 may be used by the computing device 225, the VLC transceiver 205, and/or the VLC device 125.

VLC transceiver 205 may include a backlighted LCD screen, an LED display, an OLED, a television, or the like. VLC transceiver 205 may also be convenience lighting associated with VLC device 125 and/or computing device 225, such as keypad illumination on a handheld device. VLC transceiver 205 may be configured to receive and/or transmit VLC signals to a device, such as UE 105. VLC transceiver 110 may include a transceiver, a receiver, a photodetector, a camera or the like. For example, VLC transceiver 110 may include a camera and a display associated with the computing device 225; the camera may be configured to receive VLC signals, while the display may be configured to transmit VLC signals.

Media server 215 may include software, firmware and/or hardware. In one example embodiment, media server 215 may be a hardware device such as a computing device, a mainframe system, a desktop, a laptop, or the like. Media server 215 may store and share media. For example, media server 215 may share media with UE 105 VLC transceiver 205, computing device 225, and/or VLC devices 125. Media server 215 may be used to stream content to a target destination. For example, media server 215 may stream media content to UE 105 and/or VLC device 125.

Figure 5:
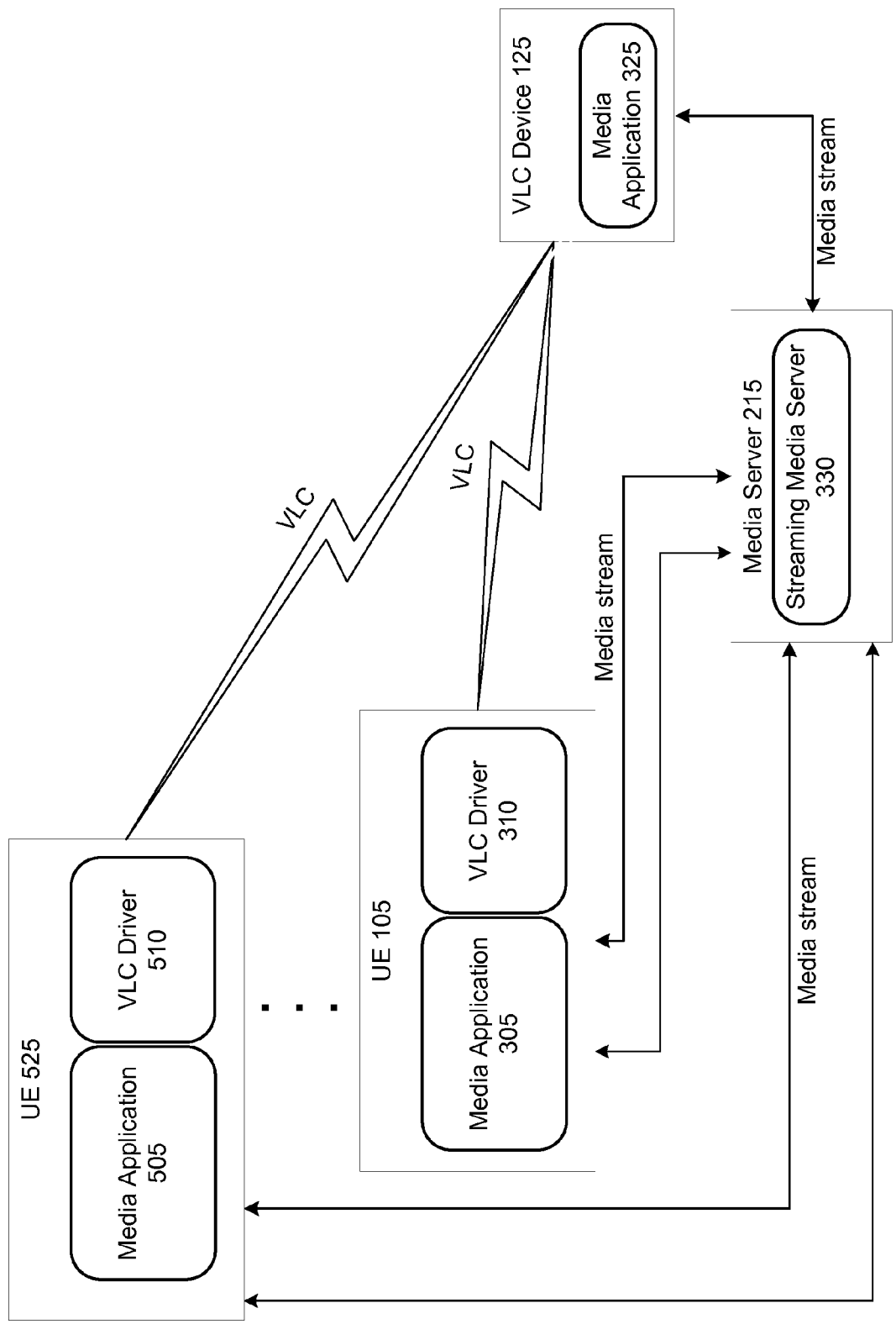
FIG. 5 illustrates another example embodiment of a system for enabling peer-to-peer multimedia mobility presence and/or content discovery using VLC.

FIG. 5 illustrates another example embodiment of a system for enabling peer-to-peer multimedia mobility presence and/or content discovery using VLC. This may be done, for example, to enable a peer, such as a display monitor, to broadcast stream bookmark information, and IP address, and/or other control information. The broadcast information may be used by other peers, such as one or more UE devices, to initiate handover. Handover may be initiated by sending a request to a media server.

In one example embodiment, the system may be used to identify and/or select the handover opportunity for multimedia mobility. Multimedia mobility may occur between two or more devices, such as UE 105, UE 525 and VLC device 125. For example, VLC device 125 may transmit a media stream, or media stream information, to UE 105 when VLC device 125 detects UE 105.

In another example embodiment, the system may be used to discover one or more devices, such as UE 105 and/or UE 525. For example, VLC device 125 may broadcast VLC device identification. The VLC device identification may be received by UE 105 when UE 105 is within range of VLC device 125 and/or may be received by UE 525 when UE 525 is within range of VLC device 125. When UE 105 receives the VLC device identification, UE 105 may respond with a message. The message may be transmitted to VLC device 125 via VLC, or may be transmitted to media server 215, and/or VLC device 125 via a network (not shown) such as network 210 shown in FIG. 4. The message may permit media server 215, and/or VLC device 125 to discover UE 105. UE 525 may also be discovered in a similar manner.

In another example embodiment, the system may be used to discover content. For example, VLC device 125 may broadcast VLC device identification and/or stream information. The VLC device identification and/or stream information may be received by UE 105 when UE 105 is within range of VLC device 125. When UE 105 receives the VLC device identification and/or stream information, UE 105 may respond with a message. The message may be transmitted to VLC device 125 via VLC and/or may be transmitted to media server 215, and/or VLC device 125 via a network (not shown). The message may permit UE 105 to discover content and/or to receive media streams from media server 215, VLC device 125, or the like.

In another example embodiment, the system may be used to enable a UE to discover another UE. For example, UE 105 may broadcast UE device identification. The UE device identification may be received by UE 525 when UE 525 is within range of UE 105. When UE 525 receives the UE device information, UE 525 may respond with a message. The message may be transmitted to UE 105 via VLC, or may be transmitted to application media server 215, VLC device 125, and/or UE 105 via a network (not shown). The message may permit media server 215, UE 105, and/or VLC device 125 to discover UE 525.

In another example embodiment, the system may be used to discover content. For example, UE 105 may broadcast UE information and/or stream information. The UE device information and/or stream information may be received by UE 525 when UE 525 is within range of UE 105. When UE 525 receives the UE device information and/or stream information, UE 525 may respond with a message. The message may be transmitted to UE 105 and/or VLC device 125 via VLC. The message may also be transmitted to media server 215, UE 105, and/or VLC device 125 via a network (not shown). The message may permit UE 525 to discover content and/or to receive media streams from UE 105, media stream server 215, VLC device 125, or the like.

As shown in FIG. 5, UE 105 may communicate with VLC device 125 and/or UE 525 via VLC. This may be done, for example, to receive and/or transmit control information, media stream information, a media stream, data, or the like. UE 105 may include media application 305 and/or VLC driver 310. Media application 305 may be a software application executing on UE 105, such as a telephony application, a videoconferencing application, a videogame application, or the like. Media application 305 may receive media streams, such as media streams that may be transmitted by media stream server 215, UE 525 and/or VLC device 125. Additionally, media application 305 may work in conjunction with media application 325, media application 505, media server 215, and/or streaming media server 330 to deliver a rich multimedia experience.

VLC driver 310 may be a software and/or firmware application that may communicate with a VLC transceiver (not shown). VLC driver 210 may act as a translator between the VLC transceiver and applications/or operating systems executing on UE 105 that may use VLC transceiver.

UE 525 may communicate with VLC device 125 and/or UE 105 via VLC. This may be done, for example, to receive and/or transmit control information, media stream information, a media stream, data, or the like. UE 525 may include media application 505 and/or VLC driver 510. Media application 505 may be a software application executing on UE 105, such as a telephony application, a videoconferencing application, a videogame application, or the like. Media application 505 may receive media streams, such as media streams that may be transmitted by media server 215, VLC device 125, and/or UE 105. Additionally, media application 505 may work in conjunction with media application 325, media application 305, media server 215, and/or streaming media server 330 to deliver a rich multimedia experience.

VLC driver 510 may be a software and/or firmware application that may communicate with a VLC transceiver (not shown). VLC driver 510 may act as a translator/interface between the VLC transceiver and applications/or operating systems executing on UE 525.

VLC device 125 may include media application 325. Media application 325 may be a software and/or firmware application executing on VLC device 125, such as a telephony application, a videoconferencing application, a videogame application, or the like. Additionally, media application 325 may work in conjunction with media application 305, media server 215, and/or streaming media server 330 to deliver a rich multimedia experience.

Media server 215 may include streaming media server 330. Streaming media server 330 may be a software and/or firmware application that may store and share media. For example, media server 215 may share and/or stream media with media application 325, media application 305, and media application 505.

Figure 6:
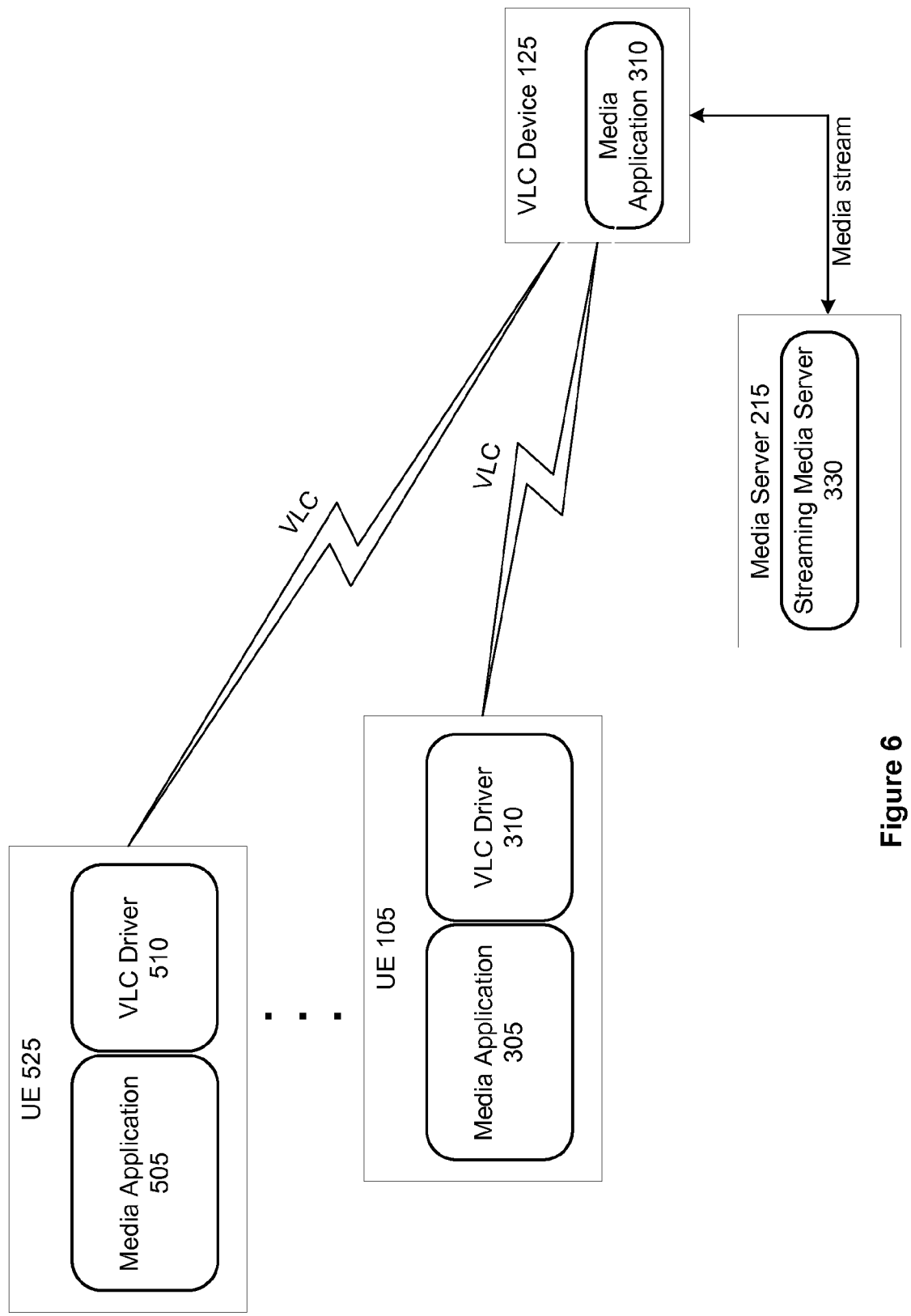
FIG. 6 illustrates another example embodiment of a system for enabling peer-to-peer multimedia mobility presence and/or content discovery using VLC.

FIG. 6 illustrates another example embodiment of a system for enabling peer-to-peer multimedia mobility presence and/or content discovery using VLC. This may be done, for example, to permit a media stream to be broadcast by a peer to all other peers. A peer may be a UE and/or a VLC device. For example, an advertisement video clip may be displayed on a large display screen that may be seen on smaller display screens contained in one or more UE devices (a PDA display screen for example).

In one example embodiment, all communication between UE 105, UE 525, and/or VLC device 125 may occur through VLC. Media server 215 may communication with VLC device 125 via a network (not shown), and may communicate with UE 105 and UE 525 via VLC device 125.

In another example embodiment, the system may be used to identify and/or select the handover opportunity for multimedia mobility. Multimedia mobility may occur between two or more devices, such as UE 105, UE 525 and VLC device 125. For example, VLC device 125 may transmit a media stream, or media stream information to UE 105 when VLC device 125 detects UE 105.

In another example embodiment, the system may be used to discover one or more devices, such as UE 105 and/or UE 525. For example, VLC device 125 may broadcast VLC device identification. The VLC device identification may be received by UE 105 when UE 105 is within range of VLC device 125 and/or may be received by UE 505 when UE 505 is within range of VLC device 125. When UE 105 receives the VLC device identification, UE 105 may respond with a message. The message may be transmitted to VLC device 125 via VLC, or may be transmitted to media server 215, and/or VLC device 125 via a network (not shown). The message may permit media server 215, and/or VLC device 125 to discover UE 105. UE 525 may also be discovered in a similar manner.

In another example embodiment, the system may be used to discover content. For example, VLC device 125 may broadcast VLC device identification and/or stream information. The VLC device identification and/or stream information may be received by UE 105 when UE 105 is within range of VLC device 125. When UE 105 receives the VLC device identification and/or stream information, UE 105 may respond with a message. The message may be transmitted to VLC device 125 and/or UE 525 via VLC and/or may be transmitted to media server 215 via VLC through VLC device 125. The message may permit UE 105 to discover content and/or to receive media streams via VLC from UE 525, VLC device 125, and/or media server 215 through VLC device 125.

In another example embodiment, the system may be used to enable a UE to discover another UE. For example, UE 105 may broadcast UE device identification. The UE device identification may be received by UE 525 when UE 525 is within range of UE 105. When UE 525 receives the UE device information, UE 525 may respond with a message. The message may be transmitted via VLC to UE 105, VLC device 125, and/or media server 215 through VLC device 125. The message may permit media server 215, UE 105, and/or VLC device 125 to discover UE 525.

In another example embodiment, the system may be used to discover content. For example, UE 105 may broadcast UE information and/or stream information. The UE device information and/or stream information may be relieved by UE 525 when UE 525 is within range of UE 105. When UE 525 receives the UE device information and/or stream information, UE 525 may respond with a message. The message may be transmitted to UE 105 and/or VLC device 125 via VLC. The message may also be transmitted to media server 215 via VLC through VLC device 125. The message may permit UE 525 to discover content and/or to receive media streams from UE 105, media server 215, VLC device 125, or the like.

As shown in FIG. 6, UE 105 may communicate with VLC device 125 and/or UE 525 via VLC. This may be done, for example, to receive and/or transmit control information, media stream information, a media stream, data, or the like. UE 105 may include media application 305 and/or VLC driver 310. Media application 305 may be a software application executing on UE 105, such as a telephony application, a videoconferencing application, a videogame application, or the like. Media application 305 may receive media streams, such as media streams that may be transmitted by media server 215, UE 525 and/or VLC device 125. Additionally, media application 305 may work in conjunction with media application 505, media application 310, and/or streaming media server 330 to deliver a rich multimedia experience.

VLC driver 310 may be a software and/or firmware application that may communicate with a VLC transceiver (not shown). VLC driver 310 may act as a translator/interface between the VLC transceiver and applications/or operating systems executing on UE 105.

UE 525 may communicate with VLC device 125 via VLC. This may be done, for example, to receive and/or transmit control information, media stream information, a media stream, data, or the like. UE 525 may include media application 505 and/or VLC driver 510. Media application 505 may be a software and/or firmware application executing on UE 105, such as a telephony application, a videoconferencing application, a videogame application, or the like. Media application 505 may receive media streams directly (via VLC) or indirectly via a network (not shown) from one or more of media application 305, media server 215, and/or streaming media server 330.

VLC driver 510 may be a software application that may communicate with VLC transceiver hardware. VLC driver 510 may act as a translator/interface between the VLC transceiver and applications/or operating systems executing on UE 525.

VLC device 125 may include media application 310. Media application 310 may be a software/firmware application executing on VLC device 125, such as a telephony application, a videoconferencing application, a videogame application, or the like. Additionally, media application 310 may work in conjunction with media application 305, media server 215, and/or streaming media server 330.

Media server 215 may include streaming media server 330. Streaming media server 330 may be a software/firmware application that may store and share media. For example, media server 215 may share and/or stream media with media application 310 and/or media application 305.

Figure 7:
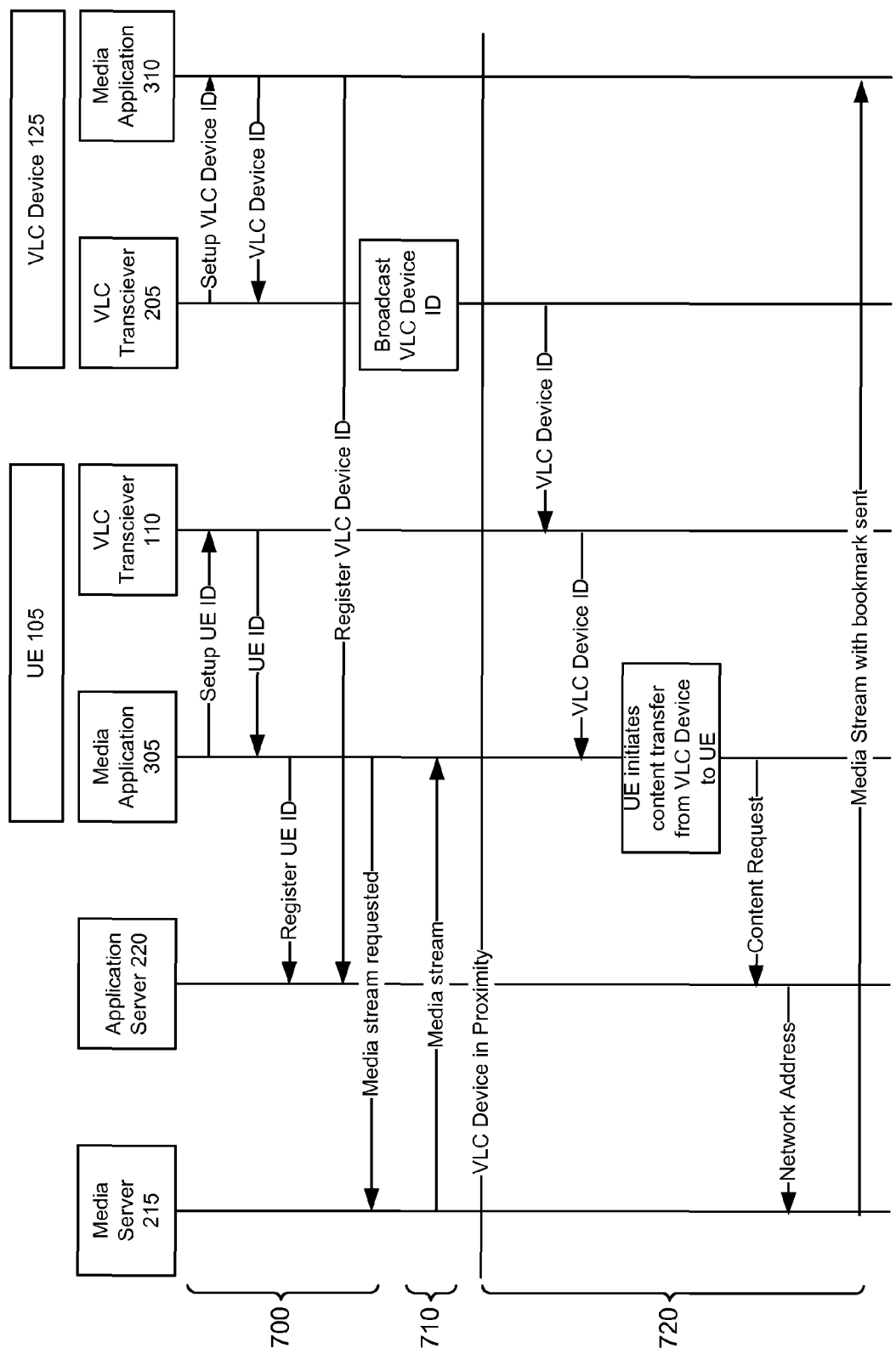
FIG. 7 illustrates an example embodiment of a signal flow for enabling device discovery.

FIG. 7 illustrates an example embodiment of a signal flow for enabling device discovery. Identifying and selecting a handover opportunity may be one of several aspects of media mobility that may be performed with minimal user interaction.

In one example embodiment, device discovery may be accomplished when a device transmits a device specific identification across a VLC medium. This identification may then be routed to an application server where an association with the application server may be made. Additionally, a picture-in-picture flag (PnP_flag) procedure may be used to support transfer of multiple sessions to a single terminal.

In another example embodiment, a multimedia mobility system may present a user associated with UE 105 with handover destinations that may have been preconfigured. The multimedia mobility system may present a user with options for handover that are limited to those in proximity of the source device, such as VLC device 125. The device ID received though the VLC link may be used to filter the list of handover targets available to UE 105. For example, a device list may be compared to a prior list and the intersection of the two lists may be presented as options for mobility.

Referring now to FIG. 7, at 700 UE 105 and VLC device 125 may register their respective identifications with application server 220. To register the identification of UE 105, media application 305 may request that VLC transceiver 110 set up an UE identification. VLC transceiver 110 may then set up a UE identification and may transmit the UE identification to media application 305. Media application 305 may then register the UE identification by transmitting the UE identification, an IP address, and/or a false PnP_flag (PnP_flag=0) to application server 220. Application server 220 may then register the UE identification by associating the UE identification with the UE 105.

To register the identification of VLC device 125, media application 310 may request that VLC transceiver 205 set up a VLC device identification. VLC transceiver 205 may then set up a VLC device identification and transmit the VLC device identification to media application 310. Media application 310 then registers the VLC device identification by transmitting the VLC device identification, an IP address, and/or a true PnP_flag (PnP_flag=1) to application server 220. Application server 220 then registers the UE identification by associating the VLC device identification with the VLC device 125.

At 710, UE 105 may request a media stream. To request a media stream, media application 305 may transmit a media stream request to media server 215. The request may include information that may identify the media content to be streamed. Media server 215 may then identify the media content and stream the media to media application 305.

At 720, VLC device 125 may be within proximity. VLC device 125 may broadcast the VLC device identification. The VLC device identification may be transmitted by VLC transceiver 205 and may be received by VLC transceiver 110. When VLC device identification is received by VLC transceiver 110, VLC transceiver 110 may notify media application 305 that a VLC device has been discovered and VLC transceiver 110 may pass the VLC device identification to media application 305. When the VLC device identification is received by media application 305, UE 105 may initiate a content transfer from UE 105 to VLC device 125. This may be done, for example, to transfer the media stream to media application 310 so that a user may view the media stream using VLC device 125.

To transfer content from VLC device 125 to UE 105, media application 305 may transmit a content request to application server 220. Application server 220 may then transmit a network address to media server 215. The network address may be the address of the media application 310 on the network. When media server 215 receives the network address, media server 215 may transmit the media stream and/or a bookmark to media application 310. The bookmark may indicate a location within the media stream. This may be done for example, in order to, allow media application 310 to jump to the location within the media stream marked by the bookmark.

Figure 8:
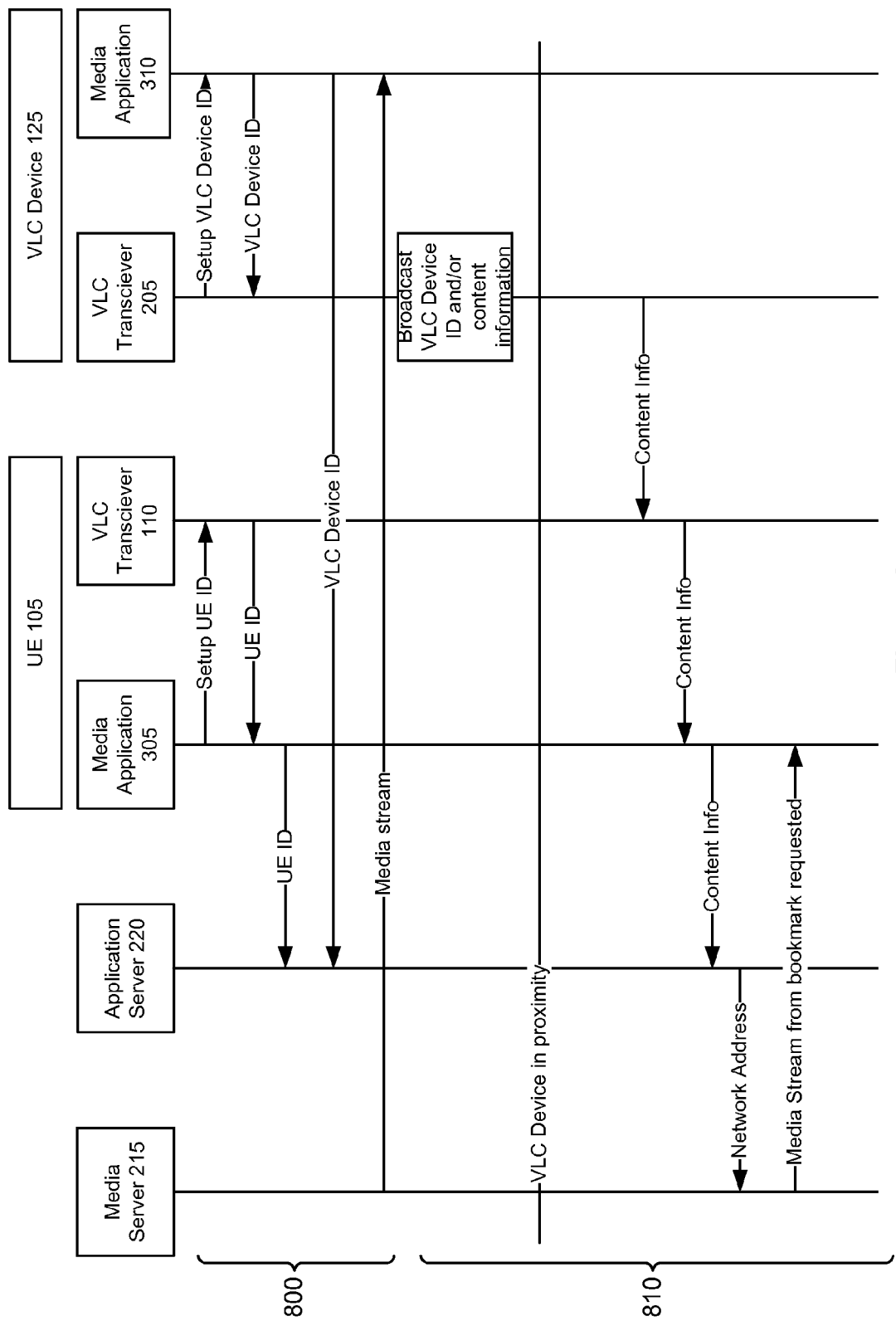
FIG. 8 illustrates an example embodiment of a signal flow for enabling content discovery.

FIG. 8 illustrates an example embodiment of a signal flow for enabling content discovery. In content discovery, the media may contain metadata pertaining to the media source, such as, for example, a source IP address, a URL, or the like to enable a handover. This metadata may also contain information that describes a position in a media stream that may be used to enable seamless streaming handover. A subchannel may also be made available through a VLC data link.

In one example embodiment, regions of a display may contain data about the content being displayed in that particular region. For example, regions of a digital sign board may include one or more hyperlinks. In a region of a display, embedded data may be contained by modulating the LEDs providing illumination to that region of the display. This embedded data may provide additional information, such as a URL, that may be related to the image being displayed.

In another example embodiment, a region of a display may be used to transfer a file. For example, a UE device may associate with a display by visibly seeing the data stream. The visibility of data stream may also be used to confirm the association.

In content discovery, image sensors, such as cameras, may be used to detect a VLC data link with a narrow field of view. The narrow field of view may be created for example by activating a select number of LEDs in selected locations inside an array of LEDs. The array of LEDs may be part of a television LED screen for example, or used for backlighting an LCD panel. Other mechanisms that may be used to provide a narrow field of view include optical elements such as mirrors, lenses and other light guiding elements that may be arranged to form a visible beam of light for free space propagation. Additionally, the image as seen through the image sensor may also be viewed by the user as a means of confirming the association with the desired data stream.

In another example embodiment, VLC may be used to receive local information related to an event such as a concert, a sports event, a live show, or the like. For example, the lyrics to a song may be communicated through the lighting arrangements (lamps, LEDs etc) or display screens at a concert venue. The VLC channel may be incorporated within such elements that are typically used at such a venue. The information may be of an instant and local nature, thereby avoiding the delay associated with propagating data from a distant server.

Referring now to FIG. 8, at 800 UE 105 and VLC device 125 may register their respective identifications with application server 220. To register the identification of UE 105, media application 305 may request that VLC transceiver 110 set up an UE identification. VLC transceiver 110 may then set up an UE identification and transmit the UE identification to media application 305. Media application 305 may then register the UE identification by transmitting the UE identification, an IP address, and/or a false PnP_flag (PnP_flag=0) to application server 220. Application server 220 will then register the UE identification by associating the UE identification with the UE 105.

To register the identification of VLC device 125, media application 310 may request that VLC transceiver 205 set up a VLC device identification. VLC transceiver 205 may then set up a VLC device identification and transmit the VLC device identification to media application 310. Media application 310 may then register the VLC device identification by transmitting the VLC device identification, an IP address, and/or a true PnP_flag (PnP_flag=1) to application server 220. Application server 220 will then register the UE identification by associating the VLC device identification with the VLC device 125. Media server 215 may then stream media content to media application 310.

At 810, VLC device 125 may be within proximity of UE 105. VLC device 125 may broadcast content information. The content information may include the VLC device identification, a stream bookmark, and a stream address. The content information may be transmitted by VLC transceiver 205 and may be received by VLC transceiver 110. When content information is received by VLC transceiver 110, VLC transceiver 110 may notify media application 305 that content has been discovered and VLC transceiver 110 may pass the content information to media application 305. When the VLC device identification is received by media application 305, UE 105 may initiate a request for a media stream. This may be done, for example, to enable UE 105 to stream the content identified by the content identification.

To request a media stream, media application 305 may transmit the content information content to application server 220. Application server 220 may then transmit a network address to media server 215. The network address may be the address of the media application 305 on the network. When media server 215 receives the network address, media server 215 may transmit the media stream and/or a bookmark to media application 305. The bookmark may indicate a location within the media stream. This may be done, for example, allow the media application 305 to jump to the location within the media stream marked by the bookmark.

Figure 9:
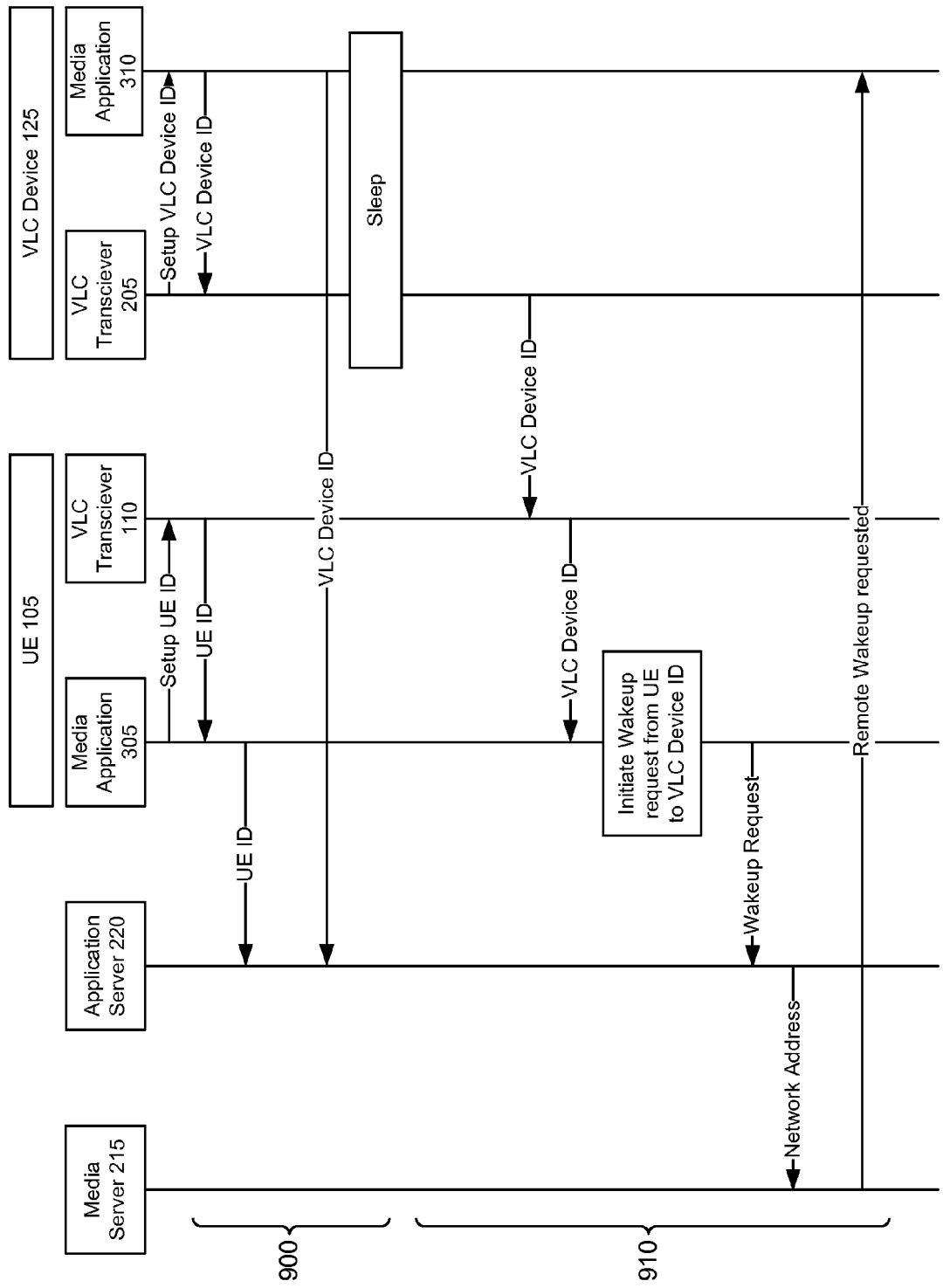
FIG. 9 illustrates another example embodiment of a signal flow for enabling device discovery.

FIG. 9 illustrates another example embodiment of a signal flow for enabling device discovery. It may not be possible to identify a target device through decoding the VLC signal from a display when the target device and/or the UE is in a sleep mode. In one example embodiment, to wake up the sleeping device, the indicator LEDs of a display may be used to send a protocol exchange message. In another example embodiment, the sleeping device may have an optical receiver that may receive a wakeup signal. For example, a VLC receiver may be integrated with an infrared receiver for this purpose. Thus, the wakeup process may be carried out using IR transmission and the subsequent media-related interactions may be carried out over the VLC medium after the device has transitioned out of the sleep mode.

Referring now to FIG. 9, at 900 UE 105 and VLC device 125 may register their respective identifications with application server 220. To register the identification of UE 105, media application 305 may request that VLC transceiver 110 set up an UE identification. VLC transceiver 110 may then set up an UE identification and transmit the UE identification to media application 305. Media application 305 registers the UE identification by transmitting the UE identification, an IP address, and/or a false PnP_flag (PnP_flag=0) to application server 220. Application server 220 then registers the UE identification by associating the UE identification with the UE 105.

To register the identification of VLC device 125, media application 310 may request that VLC transceiver 205 set up a VLC device identification. VLC transceiver 205 may then set up a VLC device identification and transmit the VLC device identification to media application 310. Media application 310 may then register the VLC device identification by transmitting the VLC device identification, an IP address, and/or a true PnP_flag (PnP_flag=1) to application server 220. Application server 220 then registers the UE identification by associating the VLC device identification with the VLC device 125. Once registration has been finalized, VLC device 125 may enter sleep mode if so desired.

At 910, VLC device 125 may be within proximity of UE 105. VLC device 125 may broadcast VLC device identification. The VLC device identification may be transmitted by VLC transceiver 205 and received by VLC transceiver 110. When the VLC device identification is received by VLC transceiver 110, VLC transceiver 110 notifies media application 305 that VLC device 125 has been discovered and VLC transceiver 110 may pass the VLC device identification to media application 305. When the VLC device identification is received by media application 305, UE 105 may initiate a wakeup request for VLC device 125. This may be done, for example, to bring VLC device 125 out of sleep mode.

To make a wakeup request, media application 305 may transmit the VLC device identification, a stream bookmark, and/or a stream address to application server 220. Application server 220 may then transmit a network address to media server 215. The network address may be the address of the media application 310 on the network. When media server 215 receives the network address, media server 215 may transmit a remote wakeup, a media stream and/or a bookmark to media application 310. The bookmark may indicate a location within the media stream. This may be done to, for example, allow the media application 310 to jump to the location within the media stream marked by the bookmark.

Figure 10:
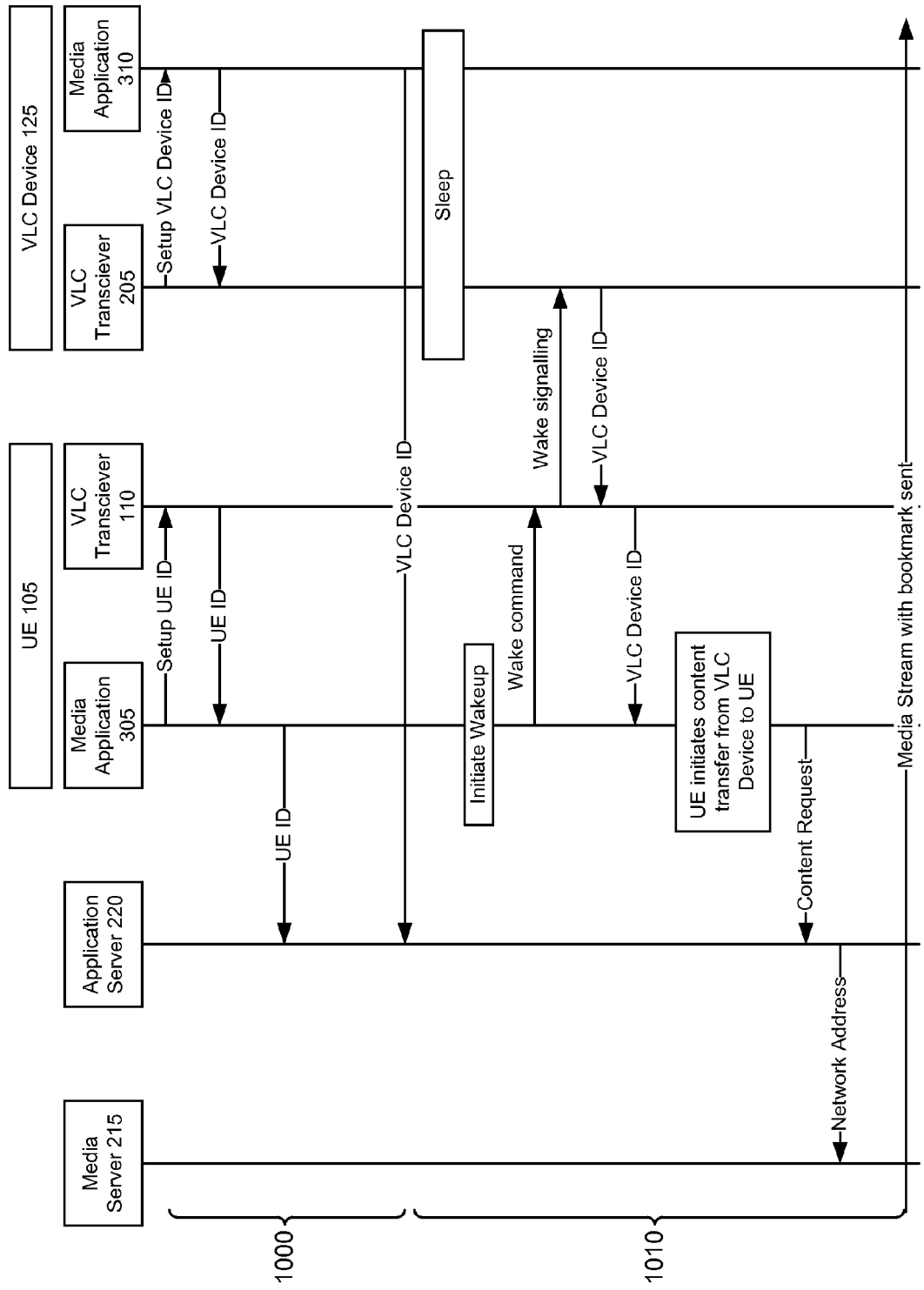
FIG. 10 illustrates another example embodiment of a signal flow for enabling device discovery.

FIG. 10 illustrates another example embodiment of a signal flow for enabling device discovery. It may not be possible to identify a target device through decoding the VLC signal from a display when the target device and/or the UE is in sleep mode. In one example embodiment, to wake up the sleeping device, the indicator LEDs on a display may be used to send a protocol exchange message. In another example embodiment, the sleeping device may have an optical receive that may receive a wake-up signal. For example, a VLC receive may be integrated with an infrared receiver.

Referring now to FIG. 10, at 1000 UE 105 and VLC device 125 may register their respective identifications with application server 220. To register the identification of UE 105, media application 305 may request that VLC transceiver 110 set up a UE identification. VLC transceiver 110 may then set up a UE identification and transmit the UE identification to media application 305. Media application 305 may then register the UE identification by transmitting the UE identification, an IP address, and/or a false PnP_flag (PnP_flag=0) to application server 220. Application server 220 will then register the UE identification by associating the UE identification with the UE 105.

To register the identification of VLC device 125, media application 310 may request that VLC transceiver 205 set up a VLC device identification. VLC transceiver 205 may then set up a VLC device identification and transmit the VLC device identification to media application 310. Media application 310 may then register the VLC device identification by transmitting the VLC device identification, an IP address, and/or a true PnP_flag (PnP_flag=1) to application server 220. Application server 220 will then register the UE identification by associating the VLC device identification with the VLC device 125. VLC device 125 may subsequently enter sleep mode if so desired.

At 1010, VLC device 125 may be within proximity of UE 105. UE 105 may initiate a wakeup command. This may be done, for example, to bring VLC device 125 out of sleep mode. To initiate a wakeup command, media application 305 may transmit a wakeup command to VLC transceiver 110, which may transmit the wakeup command to VLC transceiver 205. When the wakeup command is received at VLC transceiver 205, VLC device 125 may exit sleep mode. The VLC device identification may then be transmitted by VLC transceiver 205 and received by VLC transceiver 110. When VLC device identification is received by VLC transceiver 110, VLC transceiver 110 may notify media application 305 that a VLC device has been discovered and VLC transceiver 110 may pass the VLC device identification to media application 305. When the VLC device identification is received by media application 305, UE 105 may initiate a content transfer from UE 105 to VLC device 125. This may be done, for example, to transfer the media stream to media application 310 so that a user may view the media stream using VLC device 125.

To transfer content from VLC device 125 to UE 105, media application 305 may transmit a content request to application server 220. Application server 220 may then transmit a network address to media server 215. The network address may be the address of the media application 301 on the network. When media server 215 receives the network address, media server 215 may transmit the media stream and/or a bookmark to media application 310. The bookmark may indicate a location within the media stream. This may be for example, in order to allow the media application 310 to jump to the location within the media stream marked by the bookmark.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Also, while the various embodiments have been described in connection with the preferred embodiments of the various Figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed:
1. A method comprising:
  displaying, via visible light, media on a first device, the visible light being originated by a light source, the light source being configured to provide the media on the first device using the visible light produced thereby and to be modulated to provide a visual light communication (VLC) medium, the VLC medium being configured to enable the first device to establish communication with a second device using data or information provided by the visible light from the light source being modulated;

providing a wake up message from the first device to the second device over an infrared communication medium such that the second device is transitioned out of a sleep mode upon receipt thereof; and concurrently providing from the first device, via the visible light from the light source being modulated, the data or information to be used to establish communications between the first device and the second device.

2. The method of claim 1, wherein concurrently providing the data or information comprises:

providing a device identity from the first device to the second device;

receiving a message at the first device from the second device in response to the device identity; and using the message to discover presence of the second device.

3. The method of claim 2, wherein the first device is a video display and the second device is a mobile phone.

4. The method of claim 1, wherein concurrently providing the data or information comprises:

providing metadata associated with the media.

5. The method of claim 1, wherein concurrently providing the data or information comprises:

providing a content-related information from the first device;

receiving the content-related information in the second device; and using the received content-related information to identify in the second device, a bookmark associated with a multimedia application being executed in the first device.

6. The method of claim 1, wherein concurrently providing the data or information comprises:

using a handover procedure to initiate the transfer of execution of at least a portion of a multimedia application from the first device to the second device.

7. The method of claim 6, wherein the handover procedure comprises:

identifying a handover opportunity to initiate transfer of execution of the at least a portion of the multimedia application from the first device to the second device.

8. The method of claim 6, wherein the multimedia application comprises streaming media; and wherein the handover procedure comprises providing at least a portion of the streaming media on the first device to the second device.

9. A system comprising:

a first device configured to render media thereon, the first device comprising a light source, the light source being configured to render the media on the first device using visible light produced thereby and to be modulated to provide a visual light communication (VLC) medium, the VLC medium being configured to enable the first device to establish communication with one or more devices via the visible light from the light source being modulated, the first device further configured to provide a wake-up message over an infrared communication medium to transition one or more devices out of a sleep mode upon receipt thereof; and a second device communicatively coupled to the first device via the visible light from the light source being modulated, the second device configured to receive the wake-up message provided by the first device over the infrared communication medium and mobility information provided by the first device over the visible light from the light source being modulated and to use the mobility information to transfer at least a portion of the media from the first device to the second device for rendering in the second device.

10. The device of claim 9, wherein the mobility information a handover procedure to seamlessly transfer the at least a portion of the media from the first device to the second device.

* * * * *